United States Patent
Edlinger

[11] Patent Number: 5,630,369
[45] Date of Patent: May 20, 1997

[54] REACTOR AND A METHOD OF SMELTING COMBUSTION RESIDUES IN THE REACTOR

[75] Inventor: Alfred Edlinger, Baden, Switzerland

[73] Assignee: Holderbank Financiere Glarus AG, Glarus, Switzerland

[21] Appl. No.: 392,943

[22] PCT Filed: Jul. 1, 1994

[86] PCT No.: PCT/AT94/00085

§ 371 Date: Mar. 1, 1995

§ 102(e) Date: Mar. 1, 1995

[87] PCT Pub. No.: WO95/01312

PCT Pub. Date: Jan. 12, 1995

[30] Foreign Application Priority Data

Jul. 1, 1993 [AT] Austria .................................. 1297/93

[51] Int. Cl.[6] ........................................... F23J 3/00
[52] U.S. Cl. ................................. 110/344; 110/259
[58] Field of Search ................................. 110/235, 346, 110/165 A, 344, 236, 259; 266/205, 217, 218, 225, 227, 229

[56] References Cited

U.S. PATENT DOCUMENTS

| | | |
|---|---|---|
| 2,445,327 | 7/1948 | Keith . |
| 3,294,512 | 12/1966 | Penberthy . |
| 3,499,743 | 3/1970 | Fanica et al. . |
| 3,708,270 | 1/1973 | Birk et al. ............................ 110/346 X |
| 3,764,287 | 10/1973 | Brocious . |
| 4,046,547 | 9/1977 | Pieper . |
| 4,681,599 | 7/1987 | Obkircher ............................ 266/205 X |
| 5,015,288 | 5/1991 | Kusik et al. ............................ 75/686 |
| 5,063,860 | 11/1991 | Vojtech . |
| 5,179,902 | 1/1993 | Vojtech . |
| 5,186,112 | 2/1993 | Vojtech . |
| 5,192,487 | 3/1993 | Malmstrom et al. ................... 266/201 |
| 5,301,620 | 4/1994 | Nagel et al. ........................... 110/346 |

FOREIGN PATENT DOCUMENTS

| | | |
|---|---|---|
| 389314 | 9/1990 | European Pat. Off. . |
| 1502663 | 10/1967 | France . |
| 2453404 | 5/1976 | Germany . |
| 2615529 | 10/1977 | Germany . |
| 2718653 | 11/1978 | Germany . |

*Primary Examiner*—Henry A. Bennett
*Assistant Examiner*—Susanne C. Tinker
*Attorney, Agent, or Firm*—Cushman, Darby & Cushman IP Group of Pillsbury Madison & Sutro LLP

[57] ABSTRACT

The reactor (1) that is used to melt combustion residues incorporates a vertical partition wall (4) that incorporates return flow openings (7) and an overflow (6), wherein foamed slag is produced in the chamber (3) by the injection of gases through base nozzles (10) and the foam collapses in the second chamber (5) or the return flow channel. The liquid slag is drawn off through the taphole (11) after the desired conversion.

7 Claims, 1 Drawing Sheet

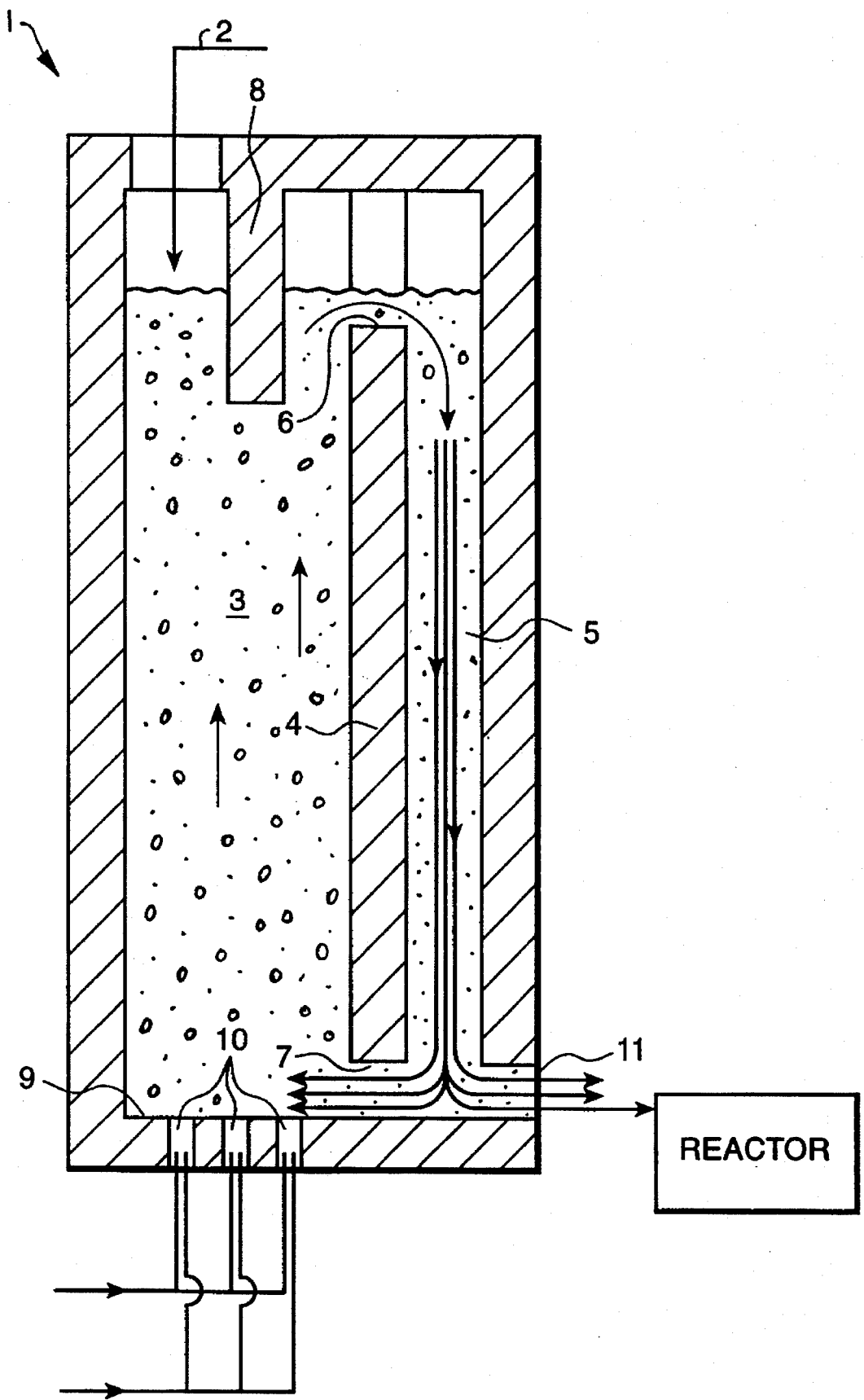

REACTOR AND A METHOD OF SMELTING COMBUSTION RESIDUES IN THE REACTOR

BACKGROUND OF THE INVENTION

1. Field of the Invention

The present invention relates to a reactor that is used for melting inorganic combustion residues, including those that may contain heavy metals and/or heavy metal compounds, in which the charge is heated and then acted upon with oxidation agents, in particular with gaseous oxygen or fuels, and oxidic slag is removed at temperatures of over 1400° C., and to a procedure for melting combustion residues with a reactor of the type described heretofore.

2. Brief Description of the Prior Art

In procedures that are used to process the products of incinerating garbage that are largely inorganic and may contain heavy metals and/or heavy metal compounds so as to form environmentally benign products, it has already been proposed that the products of garbage incineration be melted and subjected to a thermal fusion process. The thermal fusion treatment serves, primarily, to separate off volatile metals and metal compounds which could be drawn off by way of the gas phase and, subsequently, to reduce the metallic elements, when at least all of those metals which under the particular process conditions are more noble than iron are meant to be transformed from the oxide form into metals. This sort of fractionated separation of noble metals from the melt subsequently leads to an iron bath or a copper alloy, when even iron soluble metals are contained, and to a slag melt that contains the elements and compounds that are not soluble in iron or copper. Cadmium, lead, and zinc can be carried off to the gas phase and separated off. The slag melt that is so formed can be used as an active additive in mixed cements after tempering. In order to permit this kind of fractionated reduction from the melt, in accordance with an older unpublished proposal, one proceeds such that prior to fractionated reduction the combustion residues that are to be processed are first subjected to oxidation during powerful turbulence caused by the injection of gas that contains oxygen or oxygen compounds. This is meant to ensure that all of the metals contained in the reactor are first converted to oxides, in order to permit the subsequent desired fractionated reduction.

In order to ensure the melting heat that is required to melt the combustion residues that are to be processed, up to now an electrically heated converter in which oxygen could be injected above the base has been proposed. The greater part of the melting heat had to be produced electrically. Because of the high iron oxide content and CaO content in the slag, it was possible to achieve a correspondingly low viscosity of the melt given an appropriately high melting temperature, when the viscosity of the melt became lower with increasing temperatures and increasing portions of iron oxide. However, during such melting processes, in which oxygen is injected to create turbulence, the melt displays structurally viscose flow behaviour and depending on the intensity of the gas insertion it begins to foam. In the case of the procedures formerly used efforts were made to prevent the melt from foaming, since this had a negative effect with respect to the settling properties of the reduced heavy metals. A further disadvantage of the melting procedures formerly used was that relatively large smelting aggregates had to be used in order to ensure the required high melting temperatures, since the introduction of heat was adversely affected and prevented by slag floating on the surface. In the case of liquid, quiescent smelt residual carbon floats to the top because of differences in density and burns only on the surface of the bath, where it has relatively little effect on the thermodynamic behaviour of the melt. The reduced metallic iron that is simultaneously formed sinks below the quiescent smelt because of differences in density and for this reason becomes relatively difficult to access for subsequent oxidation, so that up to now relatively large amounts of energy and relatively long oxidation times were required for the oxidative melting of slags or combustion residues.

SUMMARY OF THE INVENTION

It is the task of the present invention to create a reactor of the type described in the introduction hereto, which makes it possible to melt combustion residues with significantly smaller plant and significantly less energy consumption, and at essentially shorter reaction times.

In order to solve this problem, the reactor according to the present invention, which is of the type described in the introduction hereto, is essentially characterized in that the reactor incorporates two chambers that are separated by an essentially vertical wall; in that the wall has an overflow and has, in the direction of the bottom of the reactor, return flow openings for the melt; in that in one of the chambers there is a charging opening for the charge and in the other chamber there is a taphole for oxidic slag; and in that in the chamber that is connected to the charge inlet, there are, at the bottom of said chamber, nozzles for the injection of gases, such as, for example, oxygen, and optionally fuels. Because of the fact that an essentially vertical partition wall with an overflow and a return flow opening is provided, it is possible for foamed slag to form in one of the two chambers that are separated by this vertical wall. Because of the structural viscous flow behaviour the foamed slag that is formed in this manner is of a lower viscosity and incorporates a larger number of foam pores in which there is oxygen, and because of the low specific foamed slag weight, new charge materials can pass more or less unretarded through such foamed slag. The oxidizable fractions, for example, metallic iron, aluminum, or residual carbon are burned within the slag because of the high oxygen content in the foam pores, and the resulting combustion heat acts directly on the slag itself in the interior, and is not radiated off at the surface to a considerable extent, as in the case of a quiescent smelt. Because of the fact that there are nozzles for injecting gases, e.g., oxygen, and optionally fuels arranged in the bottom of the chamber that is connected with the charge inlet, a directed flow is maintained, when the turbulence that is required for the stable maintenance of the structurally viscose behaviour of a foamed slag is ensured in the chamber that contains the foamed slag and it is simultaneously ensured that the melt that passes over the overflow into the adjacent chamber can sediment in this chamber, which is separated off by the essentially vertical wall. This cycle can continue several times through the return flow openings at the bottom of the converter, so that the dwell time that is desired can be set up during continuous operation, until such time as the desired degree of oxidation is achieved. The slag oxidate which can subsequently be subjected to fractionated reduction is drawn off from the chamber that is adjacent to the foamed slag chamber and, together with its sensible heat, can be subjected to further processing.

Thus, the reactor according to the present invention is a preferred reactor for carrying out the procedure according to the present invention in which, in order to melt combustion residues, gas is injected at a rate which results in the granulated slag having a specific foamed weight between 0.06 and 0.15 kg/liter in the chamber that is connected to the batch feed, at a temperature of over 1,400° C. The essential process parameters in the procedure according to the present invention consist of exerting shear forces until the formation of a foamed slag with the desired foamed weight in order to ensure an adequate amount of oxygen in the foam pores, which results in rapid and complete conversion of the charge material in the interior of the foamed slag. The quantity of the oxygen that is introduced into the foam pores can amount to between 2.8 and 3.0 kg oxygen/liter of foamed slag, which means that a greater amount of oxidation heat can be introduced into the body of the melt, where it can become effective. It is advantageous that the procedure according to the present invention be carried out in such a manner that some of the overflowing oxidized slag be drawn off at temperatures above 1,450° C. and subjected to partial reduction, which results in a product that is free of undesirable heavy metals or heavy metal compounds, and which can subsequently be used as an additive for cement. The quality of the cement additive can essentially be preset by proper management of the melting process, so that a wide spectrum of products suitable as additives to cement in mixed cements can be produced.

By using the procedure according to the present invention, it is possible to manage with relatively small reactors because the desired degree of oxidation can be set up by appropriate management of the circulation within the interior of the reactor. Because of the large oxygen content in the pores of the foam in the foamed slag, all in all a much smaller reaction time can be ensured for simultaneously improved introduction of energy so that, as a rule, it is possible to dispense with separate preheating. Should such preheating be necessary, however, it is possible to proceed advantageously in such a way that the charge is preheated before being moved into the oxidation reactor or such that the charge is inserted with the latent heat from the combustion system.

In order to prevent the charge material from entering the second chamber in the interior of the reactor in which the sedimentation is initiated, before conversion within the foamed slag, it is advantageous that the configuration of the reactor be such that there is a baffle in the chamber that is provided with the bottom nozzles, this being arranged close to the overflow at the partition wall, when the lower edge of this baffle lies beneath the overflow edge. Exploitation of the sensible heat of the oxidized slag that is melted in this manner is made possible in a very simple manner if the configuration is such that a further heated reactor that is provided driven by reduction is at the slag taphole from which alloys of copper, tin and/or nickel as well as oxides of zinc and/or lead concentrate and a slag can be tapped off. This is then granulated and used in mixed cement.

BRIEF DESCRIPTION OF THE DRAWING

The present invention will be described in greater detail below on the basis of a reactor that is shown diagrammatically in the drawing and is used to carry out the procedure according to the present invention.

DESCRIPTION OF THE PREFERRED EMBODIMENT

The drawing shows a reactor 1 that is used to melt combustion residues and this has a charge opening 2. In addition to combustion residue from garbage incineration plants it is also possible to introduce other slag, such as, for example, slag produced from scrap metal melting processes, through this charge opening. Within the reactor there is a first chamber 3 that is separated from a second chamber 5 by means of a partition wall 4. This partition wall 4 does not extend as far as the upper face edge of the reactor, but ends at a distance from this face wall, so as to form an overflow 6. A return flow opening 7 is formed at the lower edge of the partition wall 4 and this permits circulation between the chamber 3 and the chamber 5. In order to prevent the charge material flowing over directly into the chamber 5 there is a baffle 8 that extends downwards towards the bottom 9 of the reactor beyond the upper edge of the partition wall 4. Within the bottom 9 of the reactor there are base nozzles 10 through which oxygen and optionally fuel can be injected.

Foamed slag is produced within the chamber 3 by management of the appropriate gas flow through the base nozzles 10, and this can move across the overflow opening 6 into the second chamber 5. Within the second chamber 5, the slag flows back to the bottom as it becomes killed or because of sedimentation. The specific weight within the return flow channel or the chamber 5 is essentially increased by the collapse of the foam so that there is forced convection or circulatory flow set up if the kinetic energy of the injected oxygen or fuel alone were not to ensure the movement of this kind. This means that the injection of oxygen or of fuel can be optimized exclusively with respect to the formation of the desired foamed slag with the return flow channel being configured with an appropriate height for the forced convection.

Some of the slag that is not circulated can be drawn off through a taphole 11 when the molten slag oxidate can if necessary be subjected to secondary treatment by fractionated reduction.

I claim:

1. A reactor for melting inorganic combustion residues wherein a charge is heated and acted upon by gases and oxidic slag is drawn off at temperatures above 1,400° C., the reactor comprising two chambers that are separated by an essentially vertical wall, said wall being dimensioned to provide an overflow between the two chambers at its upper end and, at a bottom end of the wall, a return flow opening between the chambers, one of the chambers being provided with a feed opening for the charge and the other chamber being provided with a taphole for oxidic slag, said one chamber including at its bottom at least one nozzle for the injection of gases to foam the slag and to create circulation of the slag between the chambers.

2. A reactor as set forth in claim 1, further comprising an additional heated reactor provided at said taphole that is operated by reduction and from which alloys of copper, tin and/or nickel, oxides of zinc and/or lead and a slag can be drawn off.

3. A method for melting inorganic combustion residues in a reactor comprising two chambers separated by an essentially vertical wall dimensioned to provide an overflow between the two chambers at its upper end and a return flow opening between the chambers at its bottom end, said method including the steps of:

introducing a charge of said residues into one of the chambers through a feeding opening in said one chamber, said charge being heated to a temperature above 1,400° C.; and injecting gas into said one chamber through a nozzle in the chamber at a rate that results in a foamed slag being formed, said slag having a foam weight between 0.06 and 0.15 kg/liter in said one chamber.

4. A method as set forth in claim 3, wherein a portion of said slag overflowing into the other of said chambers is drawn off through a taphole in said other chamber and, at a temperature above 1,450° C., is subjected to partial reduction by an additional heated reactor provided at said taphole.

5. A method as set forth in claims 3 or 4, wherein said charge is preheated prior to being introduced to said one chamber.

6. A reactor for melting inorganic combustion residues wherein a charge is heated and acted upon by gases and oxidic slag is drawn off at temperatures above 1,400° C., the reactor comprising two chambers that are separated by an essentially vertical wall, said wall being dimensioned to provide an overflow between the two chambers at its upper end and, at a bottom end of the wall, a return flow opening between the chambers, one of the chambers including a baffle located adjacent the overflow, a lower edge of the baffle lying beneath an upper edge of the overflow, said one chamber being further provided with a feed opening for the charge and the other chamber being provided with a taphole for oxidic slag, said one chamber including at its bottom at least one nozzle for the injection gases.

7. A reactor as set forth in claim 6, further comprising an additional heated reactor provided at said taphole that is operated by reduction and from which alloys of copper, tin and/or nickel, oxides of zinc and/or lead and a slag can be drawn off.

* * * * *